(12) United States Patent
Sundelin et al.

(10) Patent No.: US 11,295,706 B2
(45) Date of Patent: Apr. 5, 2022

(54) CUSTOMIZABLE COMPACT OVERLAY WINDOW

(71) Applicant: Microsoft Technology Licensing, LLC, Redmond, WA (US)

(72) Inventors: Nils Sundelin, Duvall, WA (US); Bret Anderson, Seattle, WA (US); Samuel George Gates, Seattle, WA (US); Richard Fang, Bellevue, WA (US); Miron Vranjes, Seattle, WA (US); Christopher Doan, Seattle, WA (US); Abhishek Malani, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 627 days.

(21) Appl. No.: 15/199,647

(22) Filed: Jun. 30, 2016

(65) Prior Publication Data

US 2018/0005602 A1    Jan. 4, 2018

(51) Int. Cl.
*G09G 5/00* (2006.01)
*G09G 5/14* (2006.01)
*G06F 9/451* (2018.01)
*G06T 11/60* (2006.01)

(52) U.S. Cl.
CPC ............. *G09G 5/14* (2013.01); *G06F 9/451* (2018.02); *G06T 11/60* (2013.01); *G09G 2340/12* (2013.01)

(58) Field of Classification Search
CPC ....... G09G 5/00; G09G 2340/12; G06T 11/60
USPC ............... 345/619, 629, 634, 635, 636, 637
See application file for complete search history.

(56) References Cited

U.S. PATENT DOCUMENTS

| 7,580,080 B2 | 8/2009 | Anderson |
| 8,239,453 B2 | 8/2012 | Stevens et al. |
| 8,914,828 B2 | 12/2014 | Yuen et al. |
| 2002/0070957 A1 | 6/2002 | Trajkovic et al. |

(Continued)

FOREIGN PATENT DOCUMENTS

| CN | 101155281 A | 4/2008 |
| CN | 103338340 A | 10/2013 |

(Continued)

OTHER PUBLICATIONS

Statements, E-Mail Earnings. "Employee E-mail Suite." (2011) (pp. i-63).*
"4-Channel HDMI DVI Quad PIP Split-Screen Video Matrix Switch", Published on: Jan. 22, 2014 Available at: http://www.ambery.com/4hddvispqupi.html.
Hielscher, Robin, "Do a Picture in Picture Stream with OBS and NGINX", Published on: Jan. 1, 2014 Available at: http://www.helping-squad.com/do-a-picture-in-picture-stream-with-obs-and-nginx/.

(Continued)

*Primary Examiner* — Sarah Lhymn

(57) ABSTRACT

Embodiments disclosed herein are related to systems and methods for implementing a customizable compact overlay window in a display. In one embodiment, a computing system includes one or more processors and a storage device that stores computer executable instructions that can be executed by the processors to cause the computing system to perform the following. The system receives from an application running on the computing system customization parameters that define how the application is to be configured in a compact overlay window. The system generates the compact overlay window so that the compact overlay window is customizable according to the customization parameters. The system positions the compact overlay window in a portion of a display of the computing system.

20 Claims, 11 Drawing Sheets

(56) References Cited

U.S. PATENT DOCUMENTS

| | | | |
|---|---|---|---|
| 2004/0139480 A1* | 7/2004 | Delpuch | H04N 7/17318 725/135 |
| 2006/0245736 A1 | 11/2006 | Affaki | |
| 2010/0188579 A1 | 7/2010 | Friedman | |
| 2013/0014164 A1 | 1/2013 | Yuen et al. | |
| 2013/0120295 A1* | 5/2013 | Kim | G06F 3/01 345/173 |
| 2014/0164925 A1 | 6/2014 | Hoerentrup et al. | |
| 2014/0164935 A1 | 6/2014 | Frommer et al. | |
| 2014/0195675 A1* | 7/2014 | Silver | H04L 65/1083 709/224 |
| 2014/0201681 A1* | 7/2014 | Mahaffey | H04M 1/72569 715/846 |
| 2014/0259079 A1* | 9/2014 | Hall | H04N 21/47217 725/68 |
| 2015/0086011 A1 | 3/2015 | Kozaczuk et al. | |
| 2015/0128042 A1 | 5/2015 | Churchill et al. | |
| 2015/0205447 A1* | 7/2015 | Jia | G06F 3/0481 715/790 |

FOREIGN PATENT DOCUMENTS

| | | |
|---|---|---|
| CN | 104994314 A | 10/2015 |
| CN | 105323623 A | 2/2016 |
| CN | 105519097 A | 4/2016 |
| EP | 2139232 B1 | 3/2014 |
| EP | 2775702 A1 | 9/2014 |
| WO | 0104868 A1 | 1/2001 |
| WO | 2011163011 A2 | 12/2011 |

OTHER PUBLICATIONS

"Cisco Jabber Video for TelePresence 4.6 User Guide for Mac OS X", Retrieved on: Apr. 7, 2016 Available at: http://www.cisco.com/c/en/us/td/docs/telepresence/endpoint/Jabber_Video/4_6/CJAB_BK_CCDFE247_00_cisco-jabber-video-for-telepresence/CJAB_BK_CCDFE247_00_cisco-jabber-video-for-telepresence_chapter_01.pdf.

"What's new in iOS", Published on: Sep. 9, 2015 Available at: http://www.apple.com/in/ios/whats-new/.

Mamiit, Aaron, "Facebook Testing New Video Features: Dedicated Feed, Picture-in-Picture", Published on: Oct. 14, 2015 Available at: http://www.techtimes.com/articles/94926/20151014/facebook-testing-new-video-features-dedicated-feed-picture-in-picture-player.htm.

"HoverCam Flex Software Version 3.0.1", Published on: Nov. 19, 2012 Available at: http://www.thehovercam.com/media/manuals/hovercam_flex_windows.pdf.

"Z-Order", Retrieved from <<https://en.wikipedia.org/w/index.php?title=Z-order&oldid=709379591>>, Mar. 10, 2016, 2 Pages.

"International Search Report and Written Opinion Issued in PCT Application No. PCT/US2017/038887", dated Sep. 29, 2017, 11 Pages.

First Office Action and Search Report Issued in Chinese Patent Application No. 201780040068.4, dated Apr. 2, 2021, 16 Pages.

Second Office Action Issued in Chinese Patent Application No. 201780040068.4, dated Oct. 13, 2021, 13 Pages.

"Notice of Allowance and Search Report Issued in Chinese Patent Application No. 201780040068.4", dated Jan. 14, 2022, 9 Pages.

\* cited by examiner

CUSTOMIZABLE COMPACT OVERLAY WINDOW

BACKGROUND

Many existing computing system platforms, especially those primarily designed for mobile devices, do not allow developers and users to implement or use fully customizable compact overlay windows in a display of the computing system. These systems often limit the compact overlay window to only a few controls that are determined by the system platform and thus applications running in the compact overlay window are not able to customize controls and other UI elements that would add to the user's experience. In addition, these system platforms often do not allow for more than one compact overlay window to be active at the same time and also do not allow the compact overlay window to remain active if a user begins to perform a task in another window of the display.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to systems and methods for implementing a customizable compact overlay window in a display. In one embodiment, a computing system includes one or more processors and a storage device that stores computer executable instructions that can be executed by the processors to cause the computing system to perform the following. The system receives from an application running on the computing system customization parameters that define how the application is to be configured in a compact overlay window. The system generates the compact overlay window so that the compact overlay window is customizable according to the customization parameters. The system positions the compact overlay window in a portion of a display of the computing system.

In another embodiment, a computing system includes one or more processors and a storage device that stores computer executable instructions that can be executed by the processors to cause the computing system to perform the following. The system receives a definition of one or more regions of a customizable compact overlay window where user input is to be passed directly to an application that uses the compact overlay window. The system generates the customizable compact overlay window with the defined regions in a display of the computing system. When user input is entered into one of the defined regions, the user input is directly passed to the application, where the user input can be interpreted by the application in a manner determined by the application. When user input is entered into a region of the customizable compact overlay window that is not part of the one or more defined regions, the computing system interprets the user input.

In another embodiment, a computing system includes one or more processors and a storage device that stores computer executable instructions that can be executed by the processors to cause the computing system to perform the following. The system implements in a display a customizable compact overlay window that is customizable by an application that uses the compact overlay window. The system receives input into at least a portion of the compact overlay window. The system directly passes the input to the application. If the application has defined a response to the input to the at least one portion of the compact overlay window, any response to the input is determined by the defined response of the application. If the application has not defined a response, the system determines a response to the input.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Many existing computing system platforms, especially those primarily designed for mobile devices, do not allow developers and users to implement or use fully customizable compact overlay windows in a display of the computing system. These systems often limit the compact overlay window to only a few controls that are determined by the system platform and thus applications running in the compact overlay window are not able to customize controls and other UI elements that would add to the user's experience. In addition, these system platforms often do not allow for more than one compact overlay window to be active at the same time and also do not allow the compact overlay window to remain active if a user begins to perform a task in another window of the display. These limitations diminish from a user's experience since the application is not able to provide to the user the full amount of controls and other UI elements that are available for non-compact overlay windows. Advantageously, the embodiments disclosed herein provide for the full customization of the compact overly window.

There are various technical effects and benefits that can be achieved by implementing the aspects of the disclosed embodiments. By way of example, it is now possible to provide full customization of the compact overlay window. Further, the technical effects related to the disclosed embodiments can also include improved user convenience and efficiency gains.

Some introductory discussion of a computing system will be described with respect to FIG. 1. Then, the computing system for implementing a compact overlay window will be described with respect to FIG. 2 through FIG. 9.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
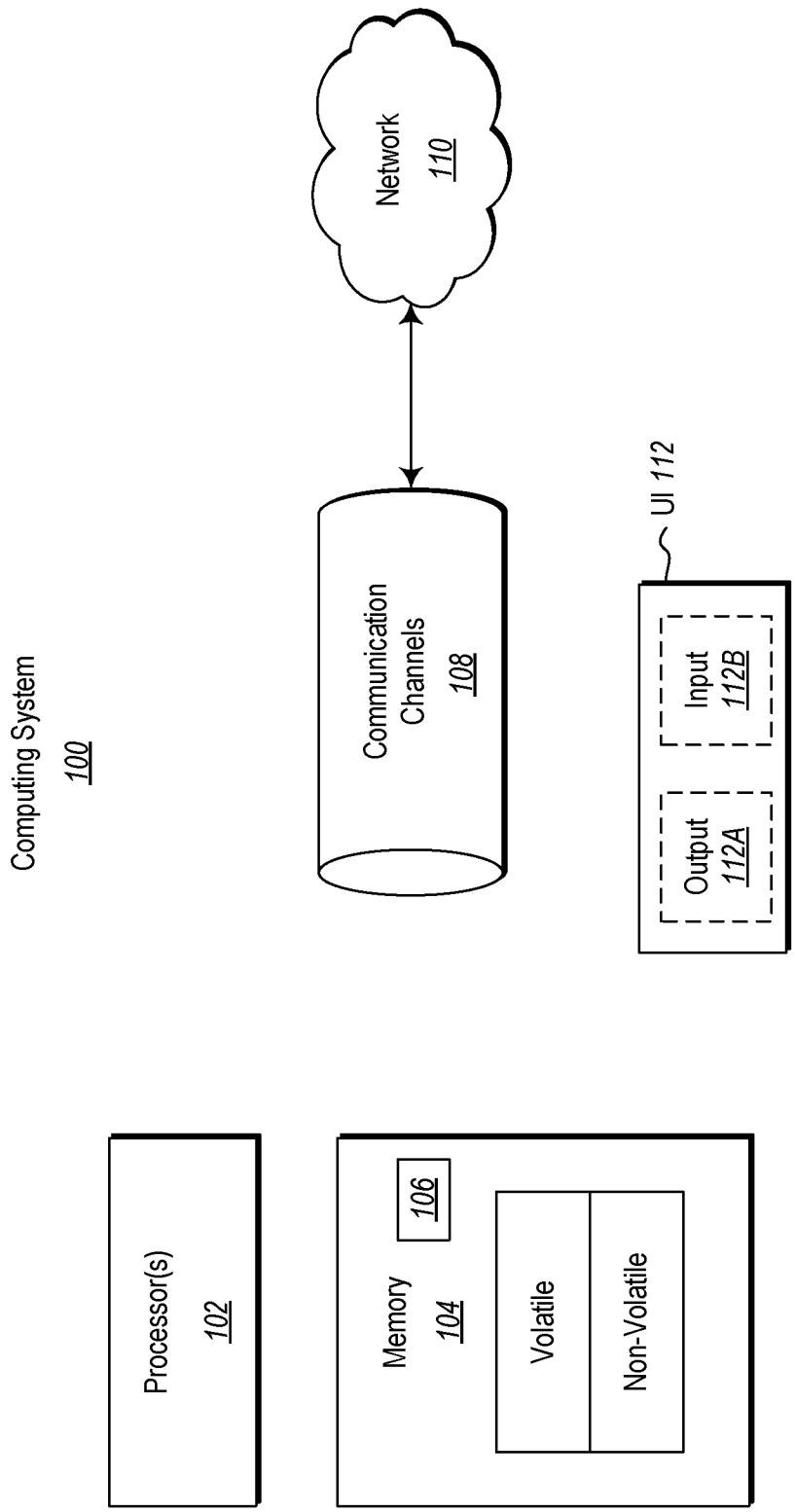
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Attention is first given to FIGS. 2A-2D, which will be used to explain the concept of a compact overlay window, which may also be commonly referred to as a Picture-in-Picture or PIP window. As used herein, a compact overlay window is defined to mean a computer window that is "on top" of at least one other computer window in a display of a computing system. The term "on top" is from a Z-order perspective of how the various windows are stacked in the display. Thus, a compact overlay window is stacked "on top" of another window when it is "closest" to the eye of a user who is looking at the display. In some embodiments, the compact overlay window may be the most on top window in a stack of displays. In other embodiments where there are multiple compact overlay windows, then one of the compact overlay windows may be on top of another compact overlay window, but may have another compact overlay window on top of it. Further, there may be instances where a notification or other UI element may be on top of a compact overlay window. Thus, a compact overlay window is generally the most on top window in the display stack, but this need not always be the case.

It will be appreciated the compact overlay windows shown in FIGS. 2A-2D are drawn for ease of explanation only and thus the relative size differences between the windows, the amount of space each window is shown occupying in the display, or the amount unoccupied space in the display is not to be limiting of the embodiments disclosed herein. Further, these figures show the windows as rectangles or having rectangular regions. Again, this is for ease of illustration only. It will be appreciated that a compact overlay region can have any reasonable shape. Further, a compact overlay window can have non-rectangular regions or no regions at all.

Figure 2A:
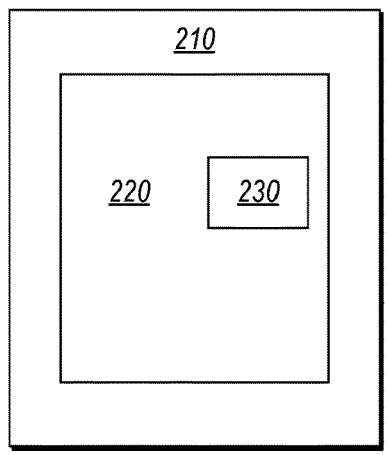
FIGS. 2A-2E illustrate embodiments of a compact overlay window.

FIG. 2A illustrates one embodiment of a compact overlay window. In the figure, a display 210 is shown. The display 210 may be a display or monitor of a computer, a tablet, a smartphone, or the like. A window 220 is displayed in the display 210. The window 220 may be implemented by a first application so that the window 220 shows at least some of the visual portions of the application such as User Interface (UI) elements as the application is running or being executed by the computing system. A compact overlay window 230 is also shown in the display. In the embodiment of FIG. 2A, the compact overlay window 230 is on top of or overlays a portion of the window 220. The compact overlay window 230 may be implemented by the first application so that the compact overly window 230 shows at least some of the visual portions of the first application such as User Interface (UI) elements as the application is running or being executed by the computing system. Alternatively, the compact overly window may be implemented by a second application so that the compact overly window 230 shows at least some of the visual portions of the second application such as User Interface (UI) elements as the second application is running or being executed by the computing system. It will be noted that in the embodiments disclosed herein, even though the compact window is on top of or overlays the window 220, the window 220 remains "active" such that the first application is able to run in the window 220 simultaneously with the first or second application that is also running in the compact overlay window 230. This advantageously allows a user to use or view both windows at the same time as needed.

It will be appreciated that the compact overlay window 230 is generally of a smaller size than at least one other window in the display such as window 220, as is shown in FIG. 2A. However, the compact overlay window 230 need not necessarily be smaller as long as it is "on top" as previously described. It will be appreciated, however, that if the compact overlay window 230 is the same size or close to the same size as the window 220, then the window 220 may not be viewable or useable by a user of the computing system 200.

Figure 2B:
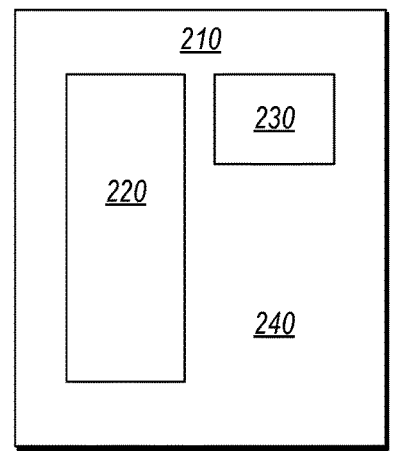

FIG. 2B shows an alternative embodiment of a compact overlay window. As shown in this figure, the compact overlay window 230 is not on top of a portion of the window 220. Thus, it is not necessary for the compact overlay window 230 to actually be on top of another window for it to be a compact overlay window. If at a later time, a window is opened in the space 240 or the window 220 is expanded into the space 240, the compact overlay window 230 would remain "on top".

Figure 2C:
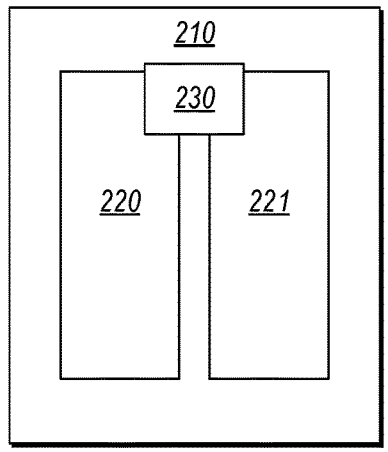

FIG. 2C illustrates a further embodiment of a compact overlay window. As shown in this embodiment, the compact overlay window 230 is on top of the window 220 and a second window 221. Thus, this embodiment shows that a compact overlay window may be on top of more than one window. In this embodiment, all of the window may be active simultaneously.

Figure 2D:
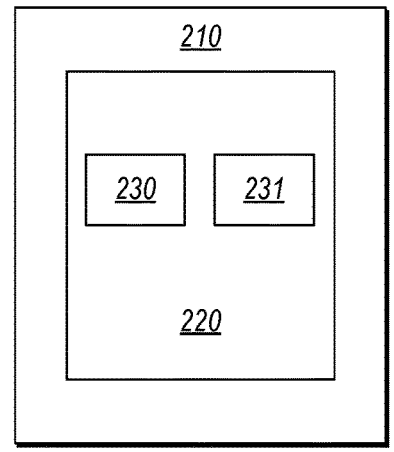

FIG. 2D illustrates another embodiment of a compact overlay window. As shown in this figure, a second compact overlay window 231 is on top of the window 220 along with the compact overlay window 230. This embodiment shows that there can be more than one compact overlay window that is implemented in the display 210 at the same time. As with the other embodiments, all of the window may be active simultaneously.

Figure 2E:
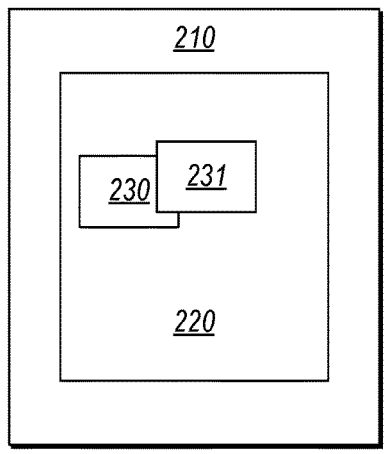

FIG. 2E illustrates another embodiment of a compact overlay window As shown in this figure, a second compact overlay window 231 is on top of a portion of the compact overlay window 230. This embodiment shows, as discussed above, where there are multiple compact overlay windows, then one of the compact overlay windows may be on top of another compact overlay window. Although not illustrated. As with the other embodiments, all of the window may be active simultaneously.

Figure 3:
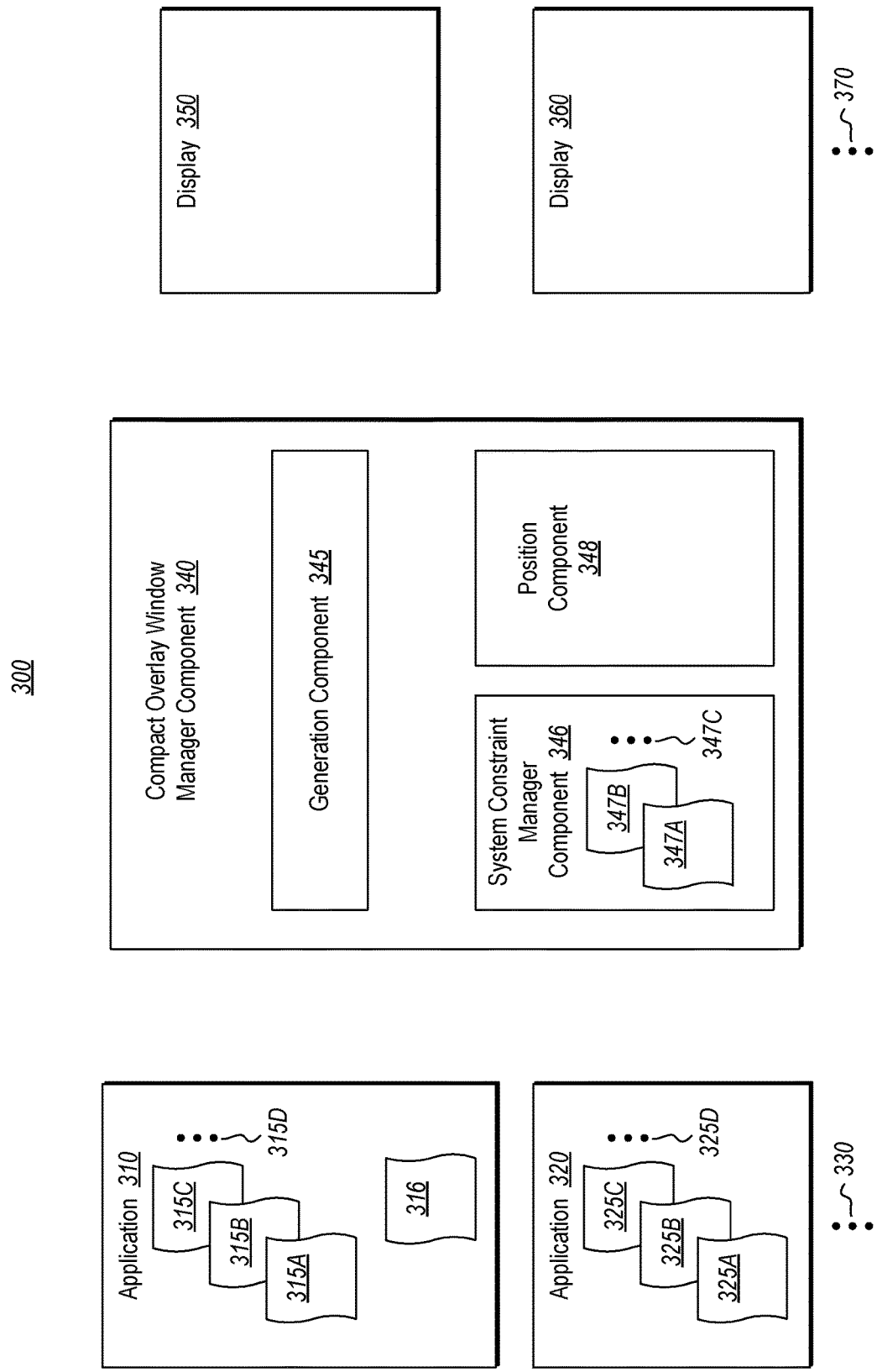
FIG. 3 illustrates an embodiment of a computing system for implementing a customizable compact overlay window in a display.

Attention is now given to FIG. 3, which illustrates an embodiment of a computing system 300, which may correspond to the computing system 100 previously described. The computing system 300 includes various components or functional blocks that may implement the various embodiments disclosed herein as will be explained. The various components or functional blocks of computing system 300 may be implemented on a local computing system or may be implemented on a distributed computing system that includes elements resident in the cloud or that implement aspects of cloud computing. The various components or functional blocks of the computing system 300 may be implemented as software, hardware, or a combination of software and hardware. The computing system 300 may include more or less than the components illustrated in FIG. 3 and some of the components may be combined as circumstances warrant. Although not necessarily illustrated, the various components of the computing system 300 may access and/or utilize a processor and memory, such as processor 102 and memory 104, as needed to perform their various functions.

As illustrated in FIG. 3, the computing system 300 may include an application 310, an application 320, and any number of additional applications as denoted by ellipses 330. The applications 310, 320, and 330 may be any type of program or executable code that is configured to run on or be executed by the computing system 300. Examples of the applications include, but are not limited to, video streaming applications, audio streaming applications, other media applications, browsing applications, gaming applications, and coding applications. Thus, even though many of the embodiments that will be discussed in more detail to follow use a video streaming application as an example application, it will appreciated that any type of application may be implemented as a compact overlay window and thus the embodiments disclosed herein are not limited to video, audio, or media streaming applications. Accordingly, the embodiments disclosed herein are not limited to any particular type of application.

The application 310 may include various customization parameters 315A, 315B, 315C and any number of additional customization parameters as denoted by ellipses 315D, hereinafter also referred to as customization parameters 315. The customization parameters 315 may define various features that the application 310 may render in a compact overlay window of the computing system as will be discussed in more detail to follow. In some embodiments, the customization parameters may be declarative statements that define the given features. The customization parameters 315 may define application specific controls, application specific branding, or any type of application specific User Interface (UI) element as circumstances warrant.

For example, the application specific controls for a video or audio streaming application may include, but are not limited to, a play button, a stop button, a pause button, or a scrub bar that moves to a desired portion of a video or audio stream. The application specific branding may include, but is not limited to, the name of the company or developer who developed the application or it may include other types of advertising. The application specific UI elements may include, but are not limited to, an element such as a thumb up or down for rating the content, a picture of a user, information about the application, a work pane, or any other type of UI element that is needed for the application to perform its intended task. Accordingly, the customization parameters 315 allow the application 310 to customize the compact overlay window in any desired manner. In other words, the customization parameters 315 allow the application 310 to have full or near full control or ownership of the compact overlay window as will be discussed in more detail to follow. This is an advantage over existing systems where an application does not have any control over a compact overlay window, but is limited to the customization determined by the computing system.

In some embodiments, the customization parameters 315 may also specify a desired size of the compact overlay window or a desired location of the compact overlay window in a display of the computing system. In other embodiments, the customization parameters 315 may specify that the application 310 that is running in a non-compact overlay window in a display of the computing system should become a compact overlay window or should launch a new compact overlay window as will be explained in more detail to follow. In further embodiments, the customization parameters 315 may specify that the application 310 launch as a compact overlay window as will also be explained in more detail to follow.

Likewise, the application 320 may include various customization parameters 325A, 325B, 325C and any number of additional customization parameters as denoted by ellipses 325D, hereinafter also referred to as "customization parameters 325. The customization parameters 325 may define various features that the application 320 may render in a compact overlay window of the computing system in the manner discussed previously in relation to the customization parameters 315.

The computing system 300 may also include a compact overlay window manger component 340 (hereinafter also referred to as "compact overlay window manager"). The compact overlay window manager 340 may include various components or modules for allowing one of the applications to generate or render a compact overlay window and then for positioning the compact overlay window in the display.

For example, the compact overlay window manager 340 may include a generation module 345. The generation module 345 may include or access those elements of the computing system 300 that allow the applications 310, 320, and/or 330 to generate the compact overlay window. For example, the generation module 345 may include or expose various APIs that allow the applications to access or expose the underlying elements of the computing system 300 that are used by the application in generating the compact overlay window. In operation, the generation module 345 may receive the customization parameters 315 from the application 310 or the customization parameters 325 from the application 320. The generation module 345 may then generate or cause to be generated a compact overlay window on behalf of the application 310 or 320 so that the application 310 or 320 may run or execute in the compact overlay window.

The compact overlay window manager 340 may also include a system constraint manager component 346 that includes various system constraints 347A, 347B, and any number of additional system constraints as denoted by the ellipses 347C, which may also be referred to jointly as system constraints 347. The system constraints 347 define constraints that may be applied to the customization parameters 315 and/or 325 so that the compact overlay window specified by customization is configured in a manner acceptable to the computing system. It will be noted that the system constraints 347 may include any other reasonable constraint and thus the embodiments disclosed herein are not limited by any particular type of system constraint.

For example, the system constraint 347A may specify a minimum and/or a maximum size for the compact overlay window. If one of the customization parameters 315 and/or 325 specify a size of the compact overlay window that is larger than the specified maximum size or that is smaller than the specified minimum size, the generation module 345 will not follow the customization parameter, but will instead generate the compact overlay window that is within the defined minimum and maximum sizes.

Likewise, the system constraint 347B may specify what portions of a display of the computing system the compact overlay window may be positioned in. If one of the customization parameters 315 and/or 325 specifies a location that violates the specified portions of the display, then this customization parameter will be ignored and the compact overlay window will be placed in a position that is acceptable to the computing system. For example, the customization parameters 315 and/or 325 may specify a position in the display that is already occupied by an existing compact overlay window and so the compact overlay window will need to be placed in another portion of the display.

Accordingly, the makeup and feel in terms of a user experience of the compact overlay window is left the application 310, 320, and/or 330 as the compact overlay window manager 340 will allow the applications to render any of the customization parameters 315 or 325 that do not conflict with the system constraints 347. In other words, the compact overlay window manager 340 may only prevent the rendering of a customization parameter when the conflict with the system constraints 347 is present.

The compact overlay window manager 340 may also include a positioning component 348. In operation, the positioning component 348 may position the compact overlay window in the display of the computing system. As mentioned above, if a customization parameter specifies a location that is acceptable to the computing system, then the positioning component 348 will position the compact overlay window at that location. In addition, the positioning component 348 may resize and reposition the compact overlay window in the display in response to various user input.

In some embodiments, the positioning component 348 may also be configured to interpret various user input and then to cause the compact overlay window manager 340 to react accordingly. As will be explained in more detail to follow, some user input may be directed at various controls and other UI elements rendered in the compact overlay window as specified by one or more of the customization parameters 315 and/or 325. Such input may be passed to the application to interpret in a manner determined by the application, which will usually be in accordance with the control or UI element. For example, input directed at a play button will usually be interpreted by the application to mean the user wants to activate the play button to start a video or audio stream. However, some user input may be directed towards areas of the compact overlay window that do not include UI elements specified by the customization parameters. As will be explained in more detail to follow, the positioning component 348 may then interpret such user input and determine an appropriate response to the input.

The computing system 300 may also include a computer system display 350, a computer system display 360, and any number of additional computer system displays as denoted by the ellipses 370. The computing system displays may be a display or monitor of a computer, a tablet, a smartphone, or the like. Thus, the embodiments disclosed herein are not limited by the type of the computing system display. As will be discussed in more detail to follow, one or more compact overlay windows may be implemented in one or more of the computing system displays 350, 360, or 370.

Figure 4A:
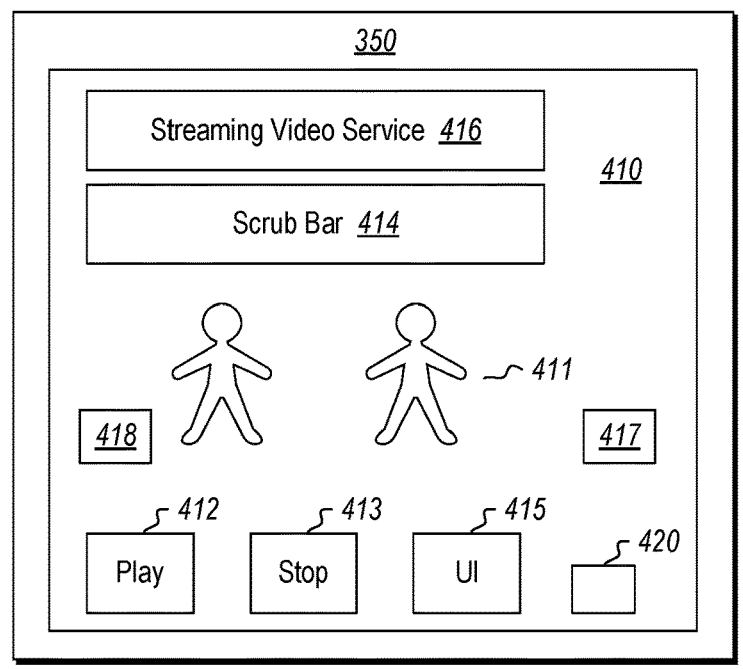
FIGS. 4A-4D illustrate embodiments of implementing a customizable compact overlay window in a display.

Having described the computing system 300, specific embodiments of implementing a compact overlay window will now be explained. FIG. 4A illustrates a window 410 that implements the application 310 that is displayed in the computing system display 350. In this embodiment, the application 310 may be a video streaming application that shows video stream 411. As shown in the window, some of the customization parameters 315 have been rendered as the following features for a video stream: a play button 412, a stop button 413, a scrub bar 414, and other UI elements 415 that are helpful for the playing of the video stream 411. In addition, a customization parameter 315 may cause the name of the application developer "Streaming Video Service" 416 to be rendered in the window.

In some embodiments the customization parameters 315 may specify that non-standard video controls or the like 417 and 418 may also be rendered in the compact overlay window 410. For example, a non-standard controller 417 may be a favorite button that allows a user to mark his or her favorite video or part thereof so that the video or part thereof can be found easily at a later time. The non-standard controller 418 may be a thumbs up or down element that allows the user to rate the video stream or to otherwise leave comments regarding the video stream. Accordingly, non-standard video controls or the like 417 and 418 may be any type of controller. Thus, as previously described, the compact overlay windows of the embodiments disclosed herein provide for customization as desired by a developer or user and are not limited to a small sub-set of customizations.

In some embodiments, the window 410 may include a user input element 420. In such embodiments, a user may enter input into the user input element 420 to initiate the generation of a compact overlay window for the application 310. In other embodiments, one of the customization parameters 315 may initiate the generation of the compact overlay window 430 by specifying that application 310 should be configured as a compact overlay window, and this may be considered as input that initiates the generation of a compact overlay window for the application 310. In still other embodiments, a second application such as application 320 may initiate the generation of compact overlay window for the application 310.

Figure 4B:
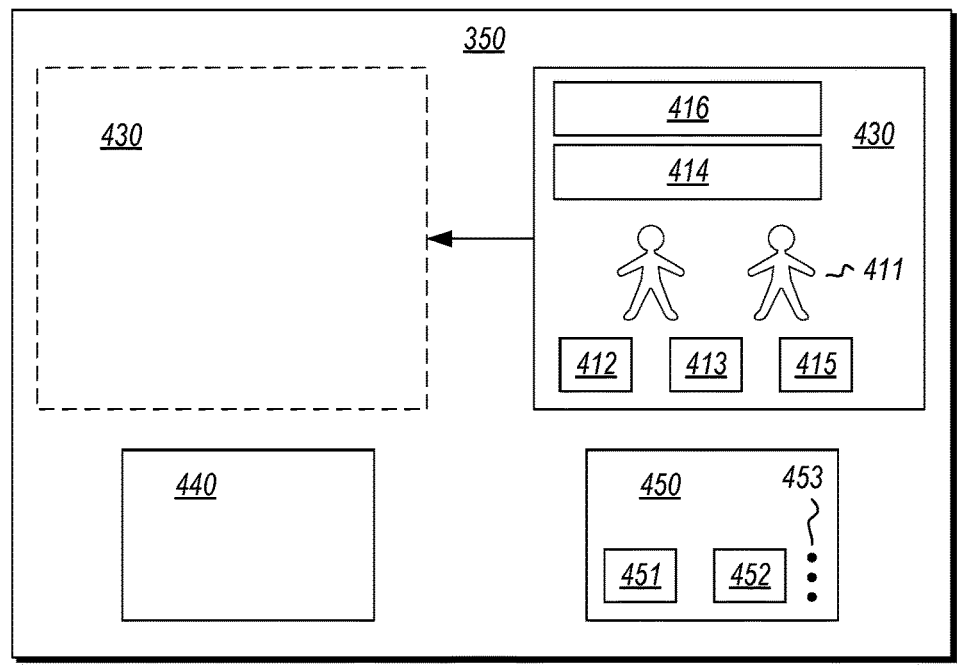

In one embodiment, upon receipt of any of the input discussed above, the customization parameters 315 may specify that the window 410 become the compact overlay window 430. In other words, the application 310 may choose to make itself the compact overlay window 430. Accordingly, as shown in FIG. 4B, the compact overlay window 430 is a smaller sized version of the window 410 that includes the same user interface elements or features. In this way, a user is able to continue to watch the video stream 411 in the compact overlay window 430.

As mentioned above, the positioning component 348 may position and/or size the compact overlay window 230 in the display 350, for example in the right corner of the display 350 as shown in FIG. 4B. The positioning and sizing will typically be specified by one of the customization parameters 315 as determined by the application 310. However, if the customization parameter is in conflict with the system constraints 347, then the positioning component 348 may move and/or resize the compact overlay window 430. The positioning component 348 may also move and/or resize the compact overlay window 430 in response to user input. This is illustrated in FIG. 4B, where the dashed line window 430 has been moved to the left corner of the display 350. It will be appreciated that the positioning component 348 may dynamically reposition and/or resize the compact overlay window 230 as circumstances warrant to ensure that the compact overlay window 430 remains on top of any other windows or other elements such as pop-ups or notifications that may appear in the display 350.

In some embodiments, a window 440 may then implement the application 310 or the application 320 while the compact overlay window 430 is implementing the application 310. As discussed above, both the compact overlay window 430 and the window 440 may be active simultaneously. For example, suppose the application 320 was a web browser that was implemented in the window 440. Accordingly, a user would be able to actively watch the video stream 411 in the compact overlay window 430 at the same time as browsing the internet in the window 440.

In some embodiments, the customization parameters 315 may specify that a second compact overlay window 450 for implementing the application 310 should also be generated while the compact overlay window 430 exists. The compact overlay window 450 may include UI elements 451, 452, and any number of additional UI elements as denoted by ellipses 453 that are specified by the customization parameters 315. Although not illustrated, the compact overlay window 450 may show the video stream 411 or it may show some other aspect of the application 310, such as a scene guide or actor explanation. In those embodiments including the window 440, it will be appreciated that all three of the windows 430, 440, and 450 may be active and usable by the user at the same time. Accordingly, the embodiments disclosed herein are not limited to any specific number of compact overlay windows that may be implemented by an application as there may any reasonable number that does not violate the system constraints 348 and that can be handled in the available space of the display 350.

Figure 4C:
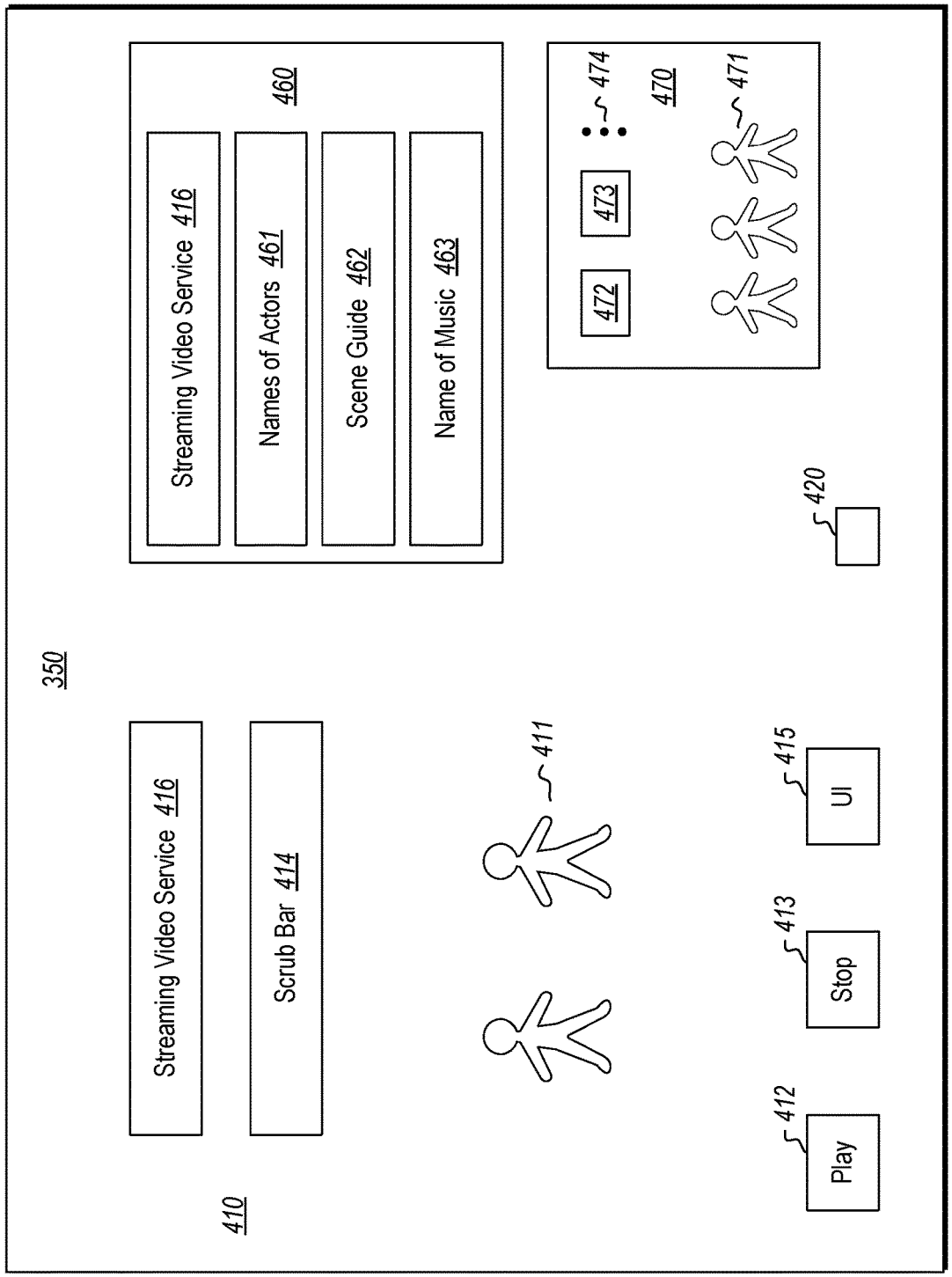

In another embodiment, upon receipt of any of the input discussed above, the customization parameters 315 may specify that a new compact overlay window 460 be generated. In other words, the application 310 may choose to generate a new compact overlay window while the original window remains in the display rather than make itself the compact overlay window. Accordingly, as shown in FIG. 4C, a compact overlay window 460 is implemented for the application 310 in addition to the window 410. In the illustrated embodiment, the compact overlay window 460 is related to the video stream 411 of window 410 and shows various UI elements specified by the customization parameters 315 such as an UI element 461 that lists the actors of the video stream 411, a UI element 462 that shows a scene guide for the video stream 411, and a UI element that lists the name of the music played in the video stream 411. Of course, it will be appreciated that the compact overlay window 460 may show other aspects of the application 310 or it may even show a mirror of the window 410 as circumstance warrant. In addition, as with the other embodiments disclosed herein both the window 410 and the compact overlay window 460 may be active at the same time so that a user may use them simultaneously.

In some embodiments, the application 320 may specify that a compact overlay window be implemented in the display 350 at the same time as the compact overlay window 460 is implemented. Accordingly, as also shown in FIG. 4C, a compact overlay window 470 is implemented for the application 320 in the display 350. In other words, the application 320 may be launched as the compact overlay window 470. In this embodiment, the application 320 may be a video streaming application that shows a live action video stream 471 of a sporting event. The compact overlay window 470 may include UI elements 472, 473, and any number of additional UI elements as denoted by ellipses 473 that are specified by the customization parameters 325.

Accordingly, FIG. 4C shows that it is possible to have compact overlay windows that implement different applications at the same time. Thus, a user would be able to watch the video stream 411 and the live sports stream 471 at the same time. Further, if the web browser were implemented in the window 440, then the user would be able to also to browse the internet while also watching the video stream 411 and the live sports stream 471.

Figure 4D:
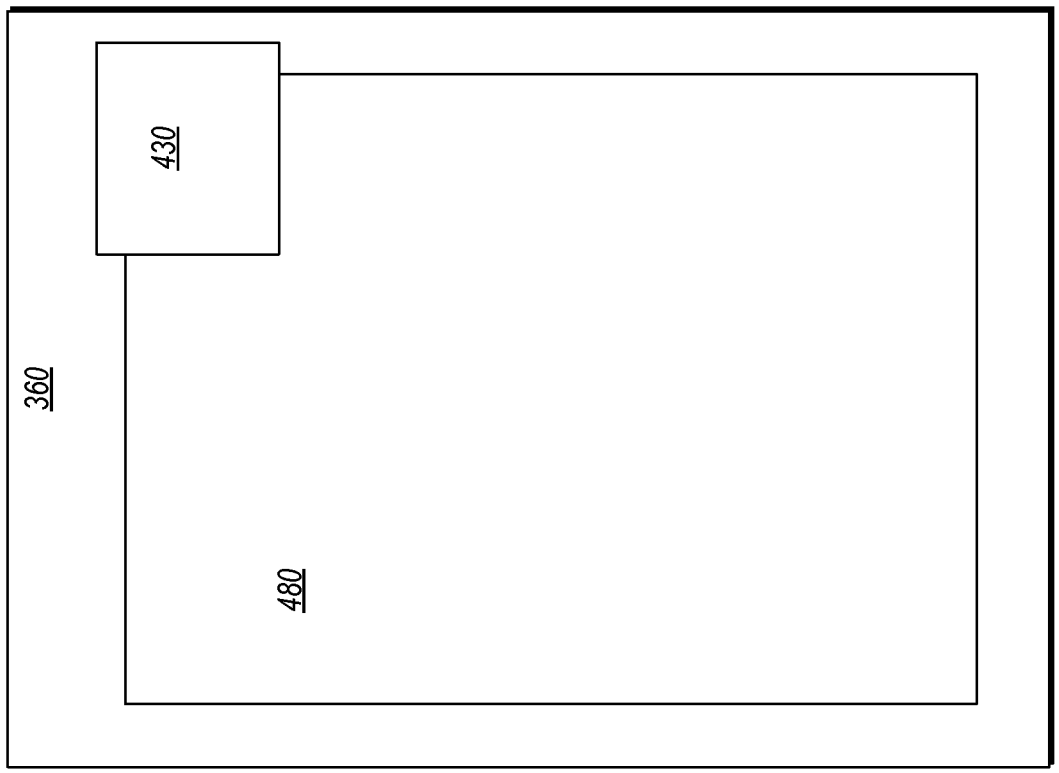
Figure 4D:
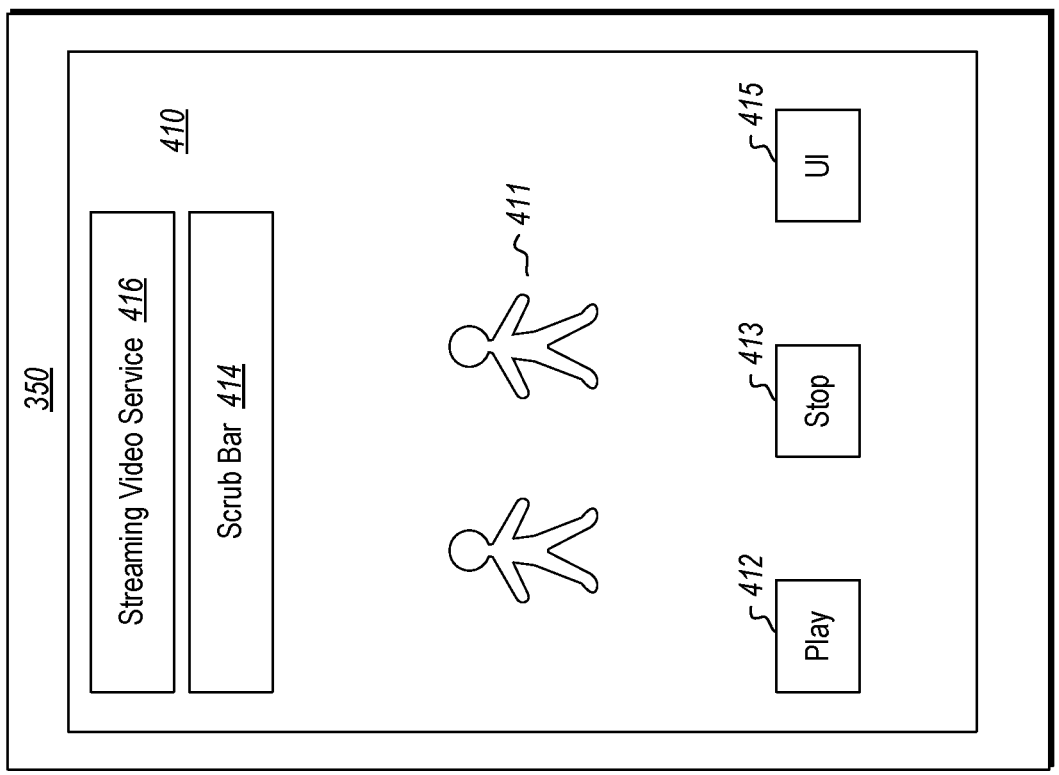

In a further embodiment illustrated in FIG. 4D, the display 350 may be a display for a smartphone or a small tablet. Accordingly, the display is relatively small. Suppose that a user is watching the video stream 411 in the display 350 as shown in FIG. 4D and that the user also is writing code in a window 480 of a display 360 that is a monitor for a computer. As will be appreciated, it would not be convenient for the user to code in the window 480 of the display 360 while also watching the video stream in the window 410 of the display 350. Accordingly, since the display 360 will typically be much larger than the display 350, in the embodiment the application 310 in conjunction with the compact overlay window manager 340 may generate the compact overlay window 430 in the display 360 so as to overlay or be on top of the window 480. In one embodiment, this may be accomplished by informing a version of the application 310 associated with the display 360 that it should launch as a compact overlay window and also informing the version of the application what UI elements to render and where in the video streaming to begin at. The positioning component 248 of the computing system or a positioning component that is associated with the display 360 may then position the compact overlay window in the appropriate place in the display 360. In this way, the user is more easily able to continue watching the video stream 411 while also coding in the window 480. Accordingly, the embodiments disclosed herein contemplate generating compact overlay windows on multiple displays of the computing system 300.

In some embodiments, as shown in FIG. 3, the application 310 may generate a definition 316 of specific regions or portions of a compact overlay window where any user input is to be passed directly by the compact overlay window manager 340 to the application. The definition 316 may define any number of regions of the compact overlay window. In some embodiments, the definition 316 is used in conjunction with the customization parameters 315 by defining those regions of the compact overlay window where any user input that is to be passed directly to the application to correspond to those regions where the customization parameters define controls and other UI elements in the manner previously described. In operation, the generation module 345 receives the definition 316 and ensures that the compact overlay window is generated with the defined regions. Although not illustrated, the applications 320 and 330 may also include a definition similar to the definition 316 as circumstances warrant.

Figure 5A:
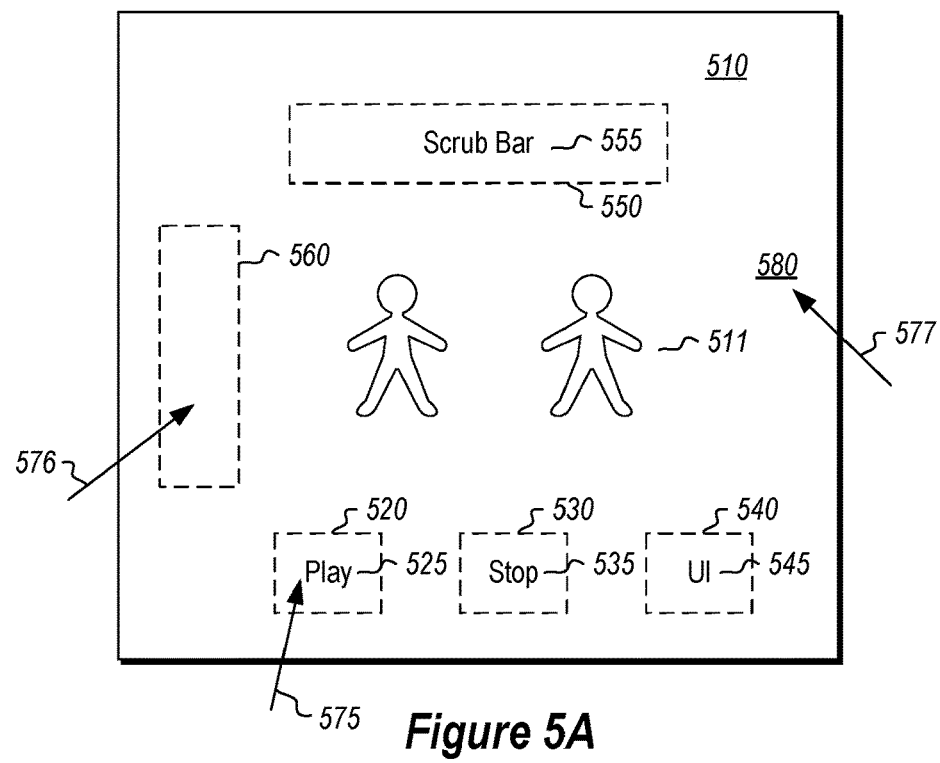
FIGS. 5A and 5B illustrate embodiments of a customizable compact overlay window having defined regions for passing user input directly to an application.

FIG. 5A illustrates a compact overlay window 510 that implements or runs a video stream 511 where specific regions of the window have been defined where any user input is to be passed directly to an application, such as application 310. It will be noted that for ease of explanation the display and other windows are omitted and only the compact overlay window 510 is shown in the figure. However, the compact overlay window 510 may correspond to any of the previously described embodiments of a compact overlay window and so may include any of the properties and advantages previously discussed in relation to any of the previously described embodiments of a compact overlay window.

As illustrated in FIG. 5A, the defined regions of the compact overlay window 510 where any user input is to be passed directly to the application are denoted by dashed boxes 520, 530, 540, 550, and 560. The defined regions 520, 530, 540, and 550 may also correspond to the location of various video steaming features specified by the customization parameters 315 such as a play button 525, a stop button 535, other UI elements 545, and a scrub bar 555. However, not all of the defined regions of the compact overlay window 510 need correspond to a location of a feature specified by the customization parameters. Accordingly, the defined region 560 does not correspond to the location of any features specified by the customization parameters 315.

In operation, the defined region 520 may receive user input represented by the arrow 575 and hereinafter called user input 575. The user input 575 (and the user input 576 and 577 and all other user input discussed herein) may correspond to a mouse click, to a touch of a finger or stylus, to a keyboard entry, or any other reasonable form of user input. The user input 575 may then be passed directly by the compact overlay window manager 340 to the application 310. This allows the application 310 to interpret the user input 375 in a manner determined by the application and to respond to the input in a manner determined by the application. For example, since the defined region 520 also includes the play button 525, the application 310 will likely interpret the user input 276 as indicating that the user desires to play the video stream 511 and will correspond accordingly. Similar results would also occur if the user input 575 were received by the defined regions 530, 540, and 550.

The defined region 560 may receive user input represented by the arrow 576 (hereinafter called user input 576) that may be passed directly by the compact overlay window manager 540 to the application 310. As mentioned previously, the application 310 may then interpret this input in a manner determined by the application. For example, in one embodiment the application 310 may hide the controls 525, 535, 545, and 555 while the video 511 is playing to increase the user experience by not crowding the compact overlay window. In such embodiments, the application 310 may interpret the user input 376 as an indication that the user wants to see one or more of the controls. Accordingly, the application 310 may respond by causing the compact overlay window manager 340 to make the controls visible to the user so that user may use the controls.

Figure 5B:
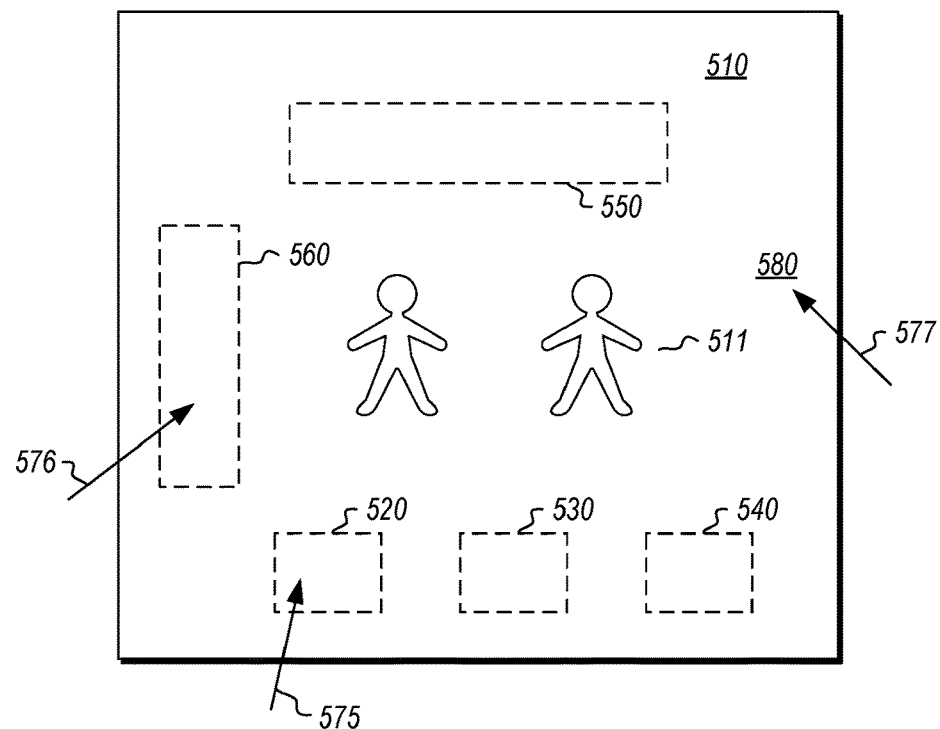

FIG. 5B illustrates an alternative embodiment of the compact overlay window 5B. In this embodiment, the defined regions 520, 530, 540, and 550 in addition to the defined region 560 do not necessarily correspond to a location of a feature specified by the customization parameters 315. Rather, in this embodiment, when the user input is received by a defined region such as region 520 and directly passed to application 310, the application 310 may interpret and respond to the input dynamically. For example, in one instance the application 310 may interpret the user input 575 as a request to play the video stream 511 in a manner similar to the embodiment of FIG. 5A and may respond by playing the video stream 511 and/or causing the play button 525 to be rendered in the region by the compact overlay window manager 340. However, at a second instance of the user input 575 being received in the defined region 520 and directly passed to the application 310, the application may interpret the user input 575 as being a request to stop or pause the video stream 511 and may respond by stopping or pausing the video stream and/or causing the stop button 535 to be rendered in the defined region 520 causing the compact overlay window manager 340. In this way, the defined regions are able to be dynamically interpreted in any manner at any time by the application 310 as the application deems appropriate.

In both FIGS. 5A and 5B, those portions of the compact overlay window 510 that are not part of the defined regions 520, 530, 540, 550, and 560 may be considered part of a non-defined region 580. The non-defined region 580 may include the remaining portions of window not part of the defined region or it may include a subset of the remaining portions. As shown in FIGS. 5A and 5B, the non-defined region 580 may receive user input represented by the arrow 577 and hereinafter called user input 577. In operation, when the user input is received by the non-defined region 580, the user input is not passed to the application 310, but is interpreted by the positioning component 348 or some other part of compact overlay manager 340. Based on the interpretation, the positioning component 348 may respond to the input in an appropriate way.

For example, the user input 577 may be a mouse or finger movement that drags the compact overlay window 510 and thus is indicative that the user desires to move the compact overlay window 510 to a different location of the display. Assuming that such movement does not violate one of the system constraints 347, the positioning component 348 may move the compact overlay window to the new location.

In another example, the user input 577 may be a pinch finger movement or a mouse zoom movement that widens the compact overlay window 510 and thus is indicative that the user desires to resize the compact overlay window 510. Assuming that such resizing does not violate one of the system constraints 347, the positioning component 348 may resize the compact overlay window 510 to the desired new size.

There may be instances, however, where the user input 577 received in the non-defined region 580 is interpreted by the positioning component 348 to be of a type that is not usually handled by the computing system, but that is more likely to be intended for the application 310 to interpret and respond to. The compact overlay window manager 340 may inform the application 310 of the user input 577 so that the application may interpret and respond to the input in a manner determined by the application.

For example, in one instance the user input 577 may be a mouse click or finger tap in the non-defined region 580. Such user input would not typically be indicative of the user wanting to move or resize the compact overlay window 510 or of some other typical windowing action performed by the compact overlay window manager 340. The compact overlay window manager 340 may inform the application 310 of the user input 577 so that the application may interpret and respond to the input. For example, the mouse click or finger tap may indicate that the user desires to hide or unhide the controls 535, 535, 545, and 555 in the manner similar to that discussed in relation to defined region 560. Accordingly, in response to the user input 577, the application 310 may cause that the controls be hidden or unhidden.

Figure 6:
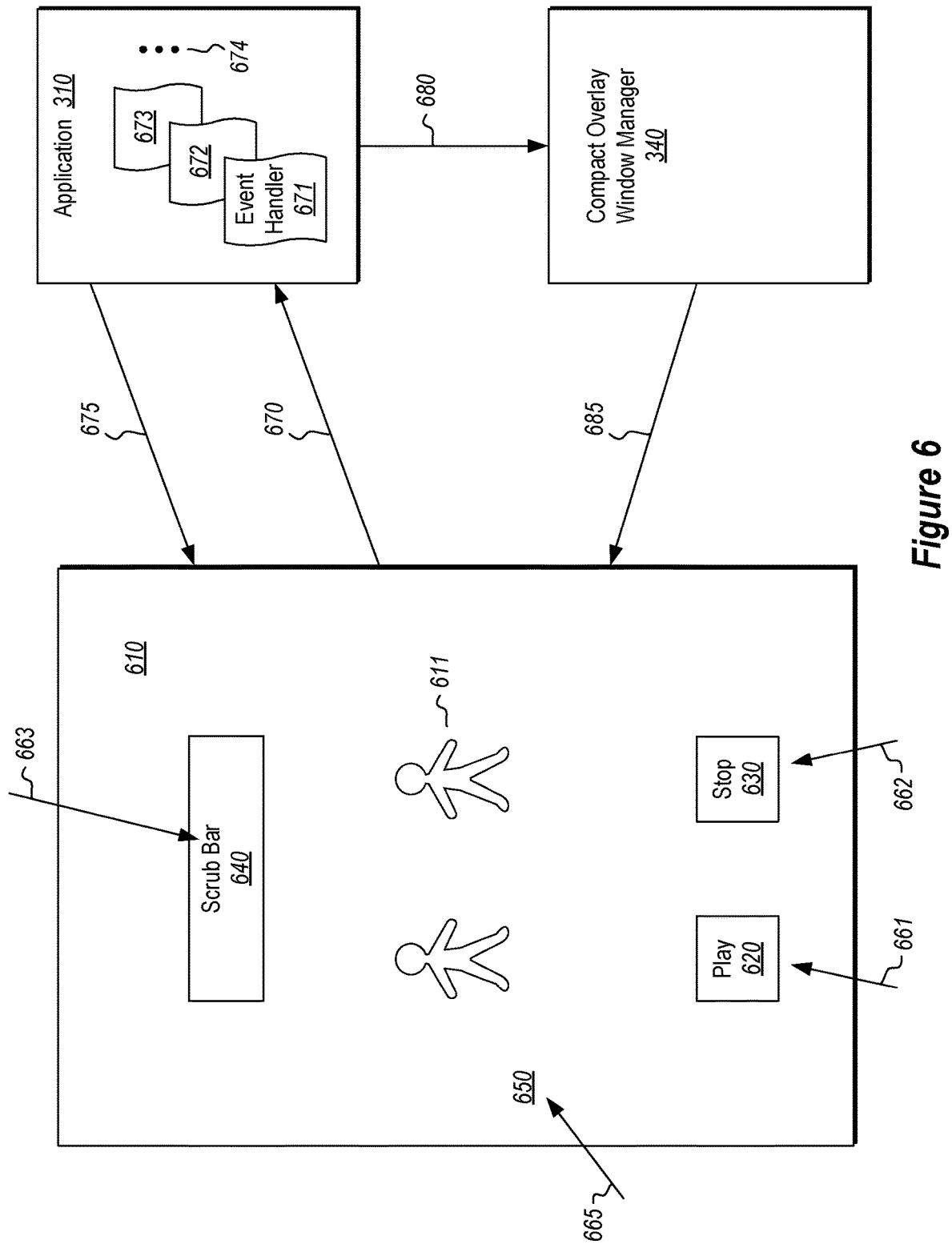
FIG. 6 illustrates an alternative embodiment of a computing system for implementing a customizable compact overlay window in a display that passes all user input to an application.

FIG. 6 represents an alternative embodiment of the computing system 300. In the embodiment of FIG. 6, all user input received by any portion of the compact overlay window is directly passed to the application 310. The application 310 may include one or more defined responses to various user inputs. The defined responses may include one or more event handlers that are part of a tree structure that defines the controls rendered by the application 310. If one of the defined responses corresponds to the user input, then the application determines a response to the input in accordance with the defined response. However, if one of the defined responses does not correspond to the user input, then the user input is passed to the compact overlay window manager 340. The compact overlay window manager, specifically the positioning component 348 may then determine an appropriate response to the user input.

For example, a compact overlay window 610 that implements or runs a video stream 611 is shown in FIG. 6. It will be noted that for ease of explanation the display and other windows are omitted and only the compact overlay window 610 is shown in the figure. However, the compact overlay window 610 may correspond to any of the previously described embodiments of a compact overlay window and so may include any of the properties and advantages previously discussed in relation to any of the previously described embodiments of a compact overlay window. As shown in the compact overly window 610, some of the customization parameters 315 have been rendered as the following features for a video stream: a play button 620, a stop button 630, and a scrub bar 640.

As illustrated, user input represented by the arrow 661 (hereinafter referred to as user input 661) may be received by the play button 620. This user input may be passed directly to the application 310 as illustrated by arrow 670.

The application 310 may include, as discussed above, defined responses for various user inputs. For example, the application 310 may include various event handlers 671, 672, 673 and any number of additional event handlers as denoted by ellipses 674. In the present embodiment, the event handler 671 may be configured to be triggered by user input for a play button control. Accordingly, the event handler 671 may be triggered by the user input 661 and the application 310 may make an appropriate response as illustrated by arrow 675, which in this case would be to play the video stream 611.

Likewise, user input represented by the arrow 662 (hereinafter referred to as user input 662) may be received by the stop button 630 and user input represented by the arrow 663 (hereinafter referred to as user input 663) may be received by the scrub bar 640. Both the user inputs 662 and 663 may be passed directly to the application 310 as illustrated by arrow 670.

In the present embodiment, the event handler 672 may be configured to be triggered by user input for a stop button control. Accordingly, the event handler 672 may be triggered by the user input 662 and the application 310 may make an appropriate response as illustrated by arrow 675, which in this case would be to stop the video stream 611. Likewise, the event handler 673 may be configured to be triggered by user input for a scrub bar control. Accordingly, the event handler 673 may be triggered by the user input 663 and the application 310 may make an appropriate response as illustrated by arrow 675, which in this case would be to advance the video stream 611 according to the amount of scrub bar is moved.

As also illustrated, user input represented by the arrow 665 (hereinafter referred to as user input 665) may be received by a region 650 of the compact overlay window 610 that does not include a control specified by the application 310. As with the previous user inputs, the user input 665 may be passed directly to the application 310 as represented by the arrow 670. However, in this case the application 310 does not include an event handler that is configured to be triggered by the user input 665. Accordingly, the application 310 may pass the user input 665 to the compact overlay window manager 340 as illustrated by arrow 680.

The positioning component 348 may then determine an appropriate response to the user input as illustrated by arrow 685. For example, if the user input 577 is a mouse or finger movement that drags the compact overlay window 610 and is thus is indicative that the user desires to move the compact overlay window 610 to a different location of the display, the positioning component 348 may move the compact overlay window to the new location. Alternatively, if the user input 577 is a pinch finger movement or a mouse zoom movement that widens the compact overlay window 610 and thus is indicative that the user desires to resize the compact overlay window 610, the positioning component 348 may resize the compact overlay window 610 to the desired new size.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
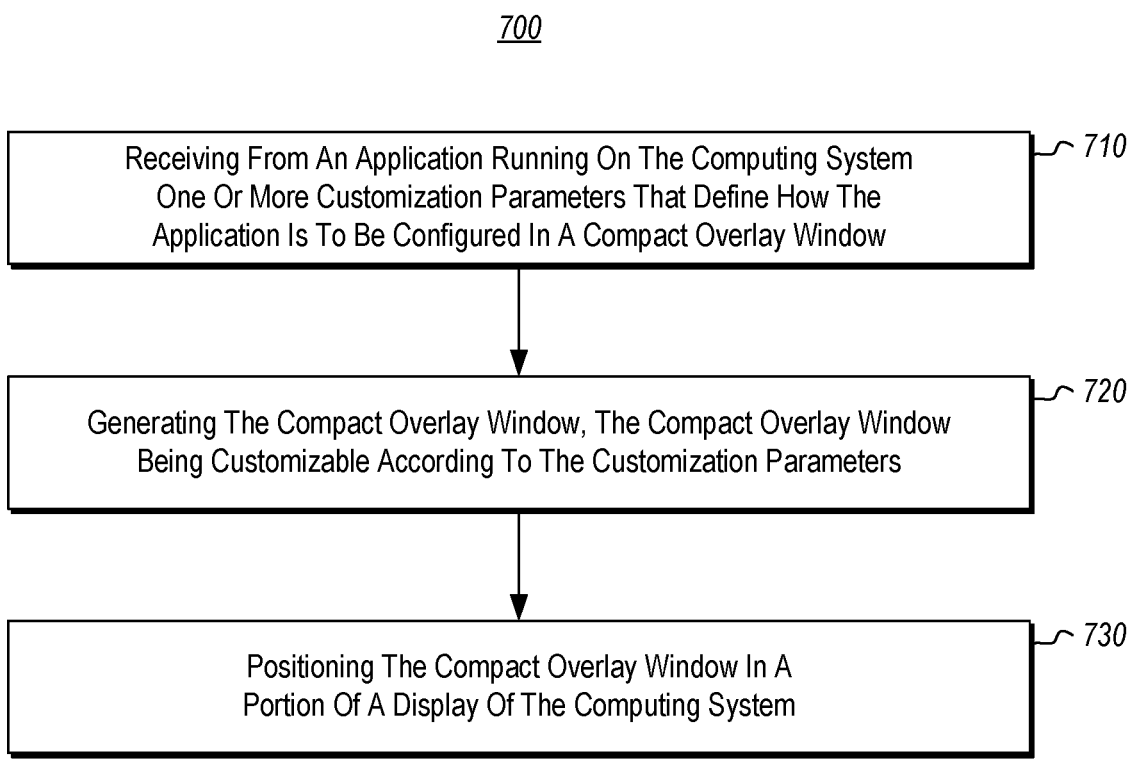
FIG. 7 illustrates a flow chart of an example method for implementing a compact overlay window in a display.

FIG. 7 illustrates a flow chart of an example method 700 for implementing a customizable compact overlay window in a display. The method 700 will be described with respect to one or more of FIGS. 2-6 discussed previously.

The method 700 includes an act of receiving from an application running on a computing system one or more customization parameters that define how the application is to be configured in a compact overlay window (act 710). For example, as previously described the application 310 may include the customization parameters 315 and the application 320 may include the customization parameters 325. These customization parameters define how the application is to be configured in compact overlay window such as those discussed previously in the various embodiments. These customization parameters may be received by the compact overlay window manager component 340 in the manner previously described.

The method 700 includes an act of generating the compact overlay window, the compact overlay window being customizable according to the customization parameters (act 720). For example, as previously described the application 310 and/or the application 320 may cause the generation module 345 to generate the compact overlay window. The generation module 345 may include or expose various APIs that allow the applications to access or expose the underlying elements of the computing system 300 that are used by the application in generating the compact overlay window as previously described.

The method 700 includes an act of positioning the compact overlay window in a portion of a display of the computing system (act 730). For example, the positioning component 348 may position the compact overlay window in a display 350 or 360 in the manner previously described.

Figure 8:
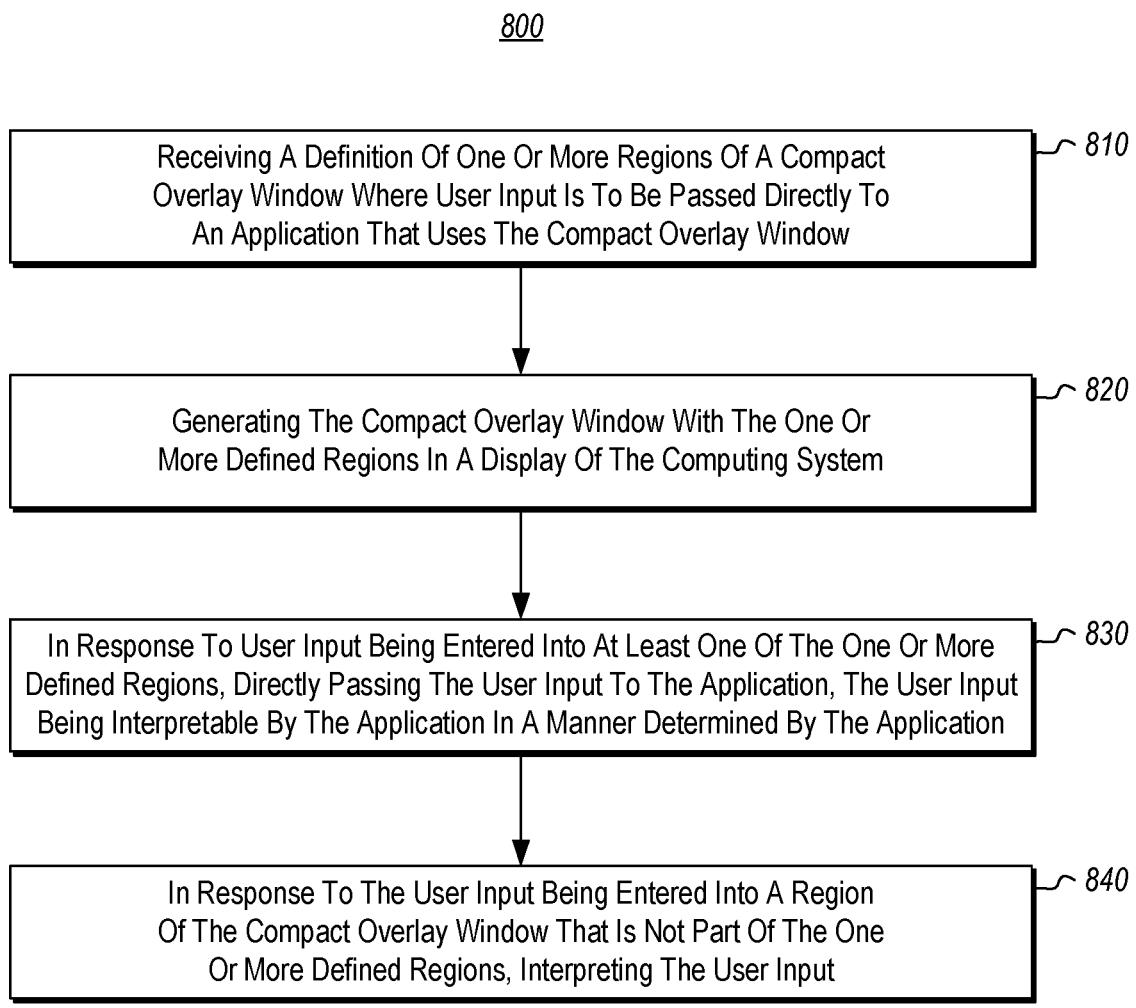
FIG. 8 illustrates a flow chart of an alternative example method for implementing a compact overlay window in a display.

FIG. 8 illustrates a flow chart of an example method 800 for implementing a customizable compact overlay window in a display. The method 800 will be described with respect to one or more of FIGS. 2-6 discussed previously.

The method 800 includes an act of receiving a definition of one or more regions of a compact overlay window where user input is to be passed directly to an application that uses the compact overlay window (act 810). For example, as previously discussed the compact overlay window manager component 340 may receive the definition 316 of the specific regions or portions of the compact overlay window where any user input is to be passed directly by the compact overlay window manager 340 to the application 310.

The method 800 includes an act of generating the compact overlay window with the one or more defined regions in a display of the computing system (act 820). For example, as previously discussed the generation component 345 may generate the compact overlay window 510 that includes the defined regions 520, 530, 540, 550, and 560.

The method 500 includes in response to user input being entered into at least one of the one or more defined regions, an act of directly passing the user input to the application (act 830). The user input is interpretable by the application in a manner determined by the application. For example, as previously discussed the user input 575 and 576 may be entered into one of the defined regions 520, 530, 540, 550, and 560 and is passed by the compact overlay window manager component 340 directly to the application 310. As also discussed, the application 310 is able to interpret and respond to the user input in a manner that is determined by the application 310.

The method 800 includes in response to the user input being entered into a region of the compact overlay window that is not part of the one or more defined regions, an act of the computing system interpreting the user input (act 840). For example, as previously discussed the user input 577 may be entered into the non-defined region 580. This user input is not passed to the application 310, but is rather interpreted by the positioning component 348. As previously described, based on the interpretation, the positioning component 348 may respond to the input in an appropriate manner.

Figure 9:
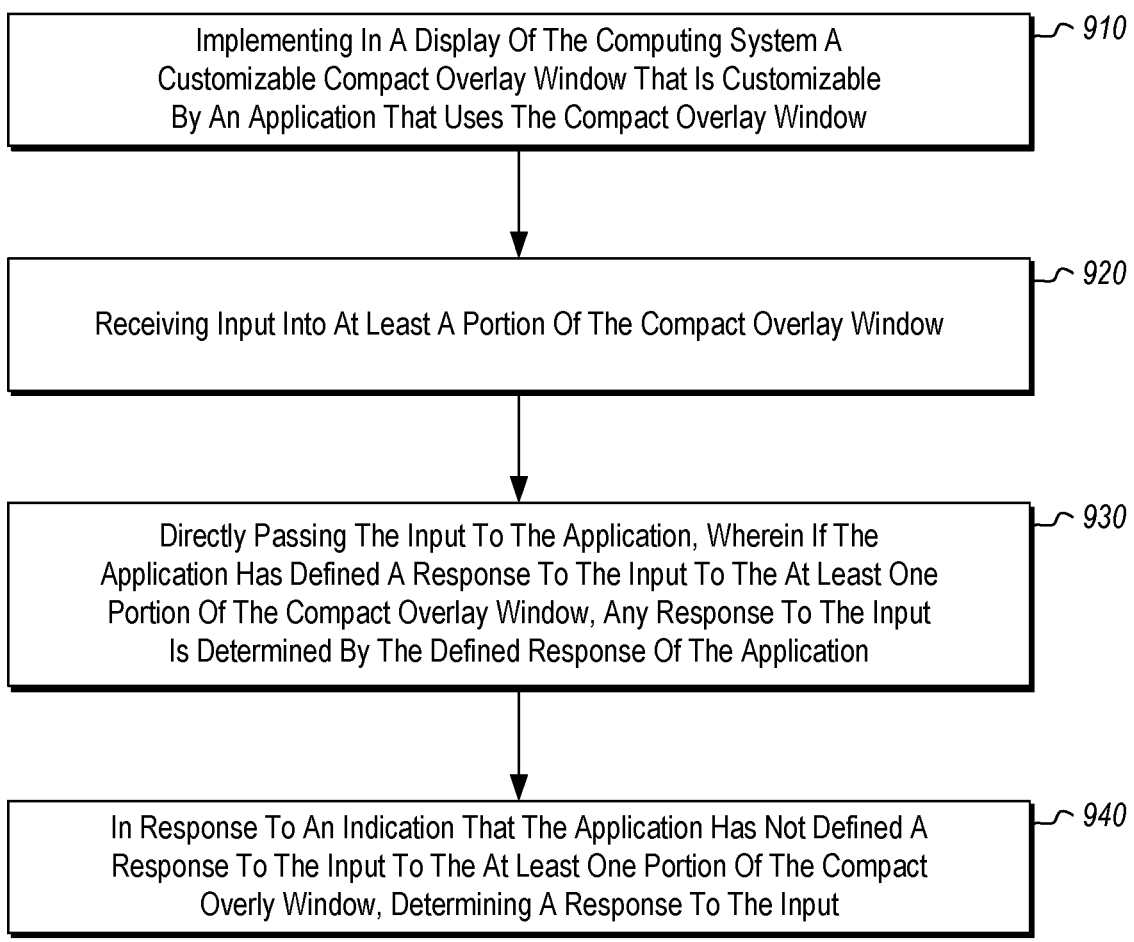
FIG. 9 illustrates a flow chart of an alternative example method for implementing a compact overlay window in a display.

FIG. 9 illustrates a flow chart of an example method 900 for implementing a customizable compact overlay window in a display. The method 900 will be described with respect to one or more of FIGS. 2-6 discussed previously.

The method 900 includes an act of implementing in a display of the computing system a customizable compact overlay window that is customizable by an application that uses the compact overlay window (act 910). For example, as previously discussed in the various embodiments disclosed here, a customizable compact overlay window may be customizable by the application 310 and/or 320. In one embodiment, the compact overlay window 610 may be implemented.

The method 900 includes an act of receiving input into at least a portion of the compact overlay window (act 920). For example, as previously discussed user input 661, 662, 663, and 665 may be received in various portions of the compact overlay window 610.

The method 900 includes an act of directly passing the input to the application (act 930). If the application has defined a response to the input to the at least one portion of the compact overlay window, any response to the input is determined by the defined response of the application. For example, as previously described the user input 661, 662, 663, and 665 may be passed directly to the application 310. The application 310 may include the event handlers 671-674, which may be configured to be triggered by certain types of user input. As previously discussed, when the user input 661, 662, and 663 triggers the event handles 671-673, the application responds to the input in the manner defined by the event handler.

The method 900 includes, in response to an indication that the application has not defined a response to the input to the at least one portion of the compact overly window, an act of the computing system determining a response to the input (act 940). For example, as previously described when the application 310 does not have an event handler for the user input 665, the application 310 passes the user input to the compact overlay window manager component 340. The positioning component 348 is then able to determine an appropriate response to the user input.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for implementing a customizable compact overlay window in a display, the computing system comprising:
    at least one processor; and
    at least one storage device having stored thereon computer-executable instructions which, when executed by the at least one processor, causes the computing system to perform the following:
        identify, at the computing system, a first application installed on the computing system in the form of a first set of executable code;
        cause the first application to operate within a first application window on the display of the computing system;
        identify, at the computing system, a second application installed on the computing system in the form of a second set of executable code that is separate from the first set of executable code, wherein the first application and the second application are different applications;
        cause the second application to operate on the display of the computing system;
        based on causing the second application to operate on the display of the computing system, receive, from the second set of executable code corresponding to the second application operating at the computing system, one or more customization parameters that define how the second application window is to be configured as a compact overlay window;
        generate the compact overlay window, the compact overlay window being customized according to the received customization parameters, wherein the first application window displaying the first application and the compact overlay window displaying the second application are simultaneously displayed at the computing system;
        automatically position the compact overlay window in a portion of the display of the computing system, the portion of the display overlapping the first application window;
        receive, at the computing system, a first user input directed at a portion of the compact overlay window that has a corresponding application specific control defined within the one or more customization parameters of the set of executable code corresponding to the second application;
        based on receiving the first user input, allow the second application to automatically process the input;
        receive, at the computing system, a second user input directed at a portion of the compact overlay window that does not have a corresponding application specific control defined within the one or more customization parameters of the set of executable code corresponding to the second application; and
        based on receiving the second user input, respond according to a configuration of the computing system.

2. The computing system of claim 1, wherein generating the compact overlay window is initiated by receiving user input that activates a user interface (UI) element of the compact overlay window.

3. The computing system of claim 1, wherein generating the compact overlay window is initiated by one or more of the customization parameters that specify when the first application should be configured in the compact overlay window.

4. The computing system of claim 1, wherein generating the compact overlay window further comprises:
    ensuring that the customization of the compact overlay window specified by the customization parameters of the first application is consistent with one or more system constraints that govern how the compact overlay window is to be configured.

5. The computing system of claim 1, wherein the one or more customization parameters of the first application define one or more application specific controls, application specific branding, or application specific UI elements.

6. The computing system of claim 1, wherein the one or more customization parameters of the first application are declarative statements that are provided by the first application to the computing system.

7. The computing system of claim 1, wherein the display of the computing system is a first display and the computing system includes a second display that is different from the first display, wherein positioning the compact overlay window in a portion of a display comprises positioning the compact overlay window in the second display.

8. The computing system of claim 1, wherein the compact overlay window is a first compact overlay window, the computing system to further caused to perform the following
    generate a second compact overlay window, the second compact overlay window being customizable according to the customization parameters; and
    position the second compact overlay window in a portion of the display of the computing system,
    wherein both the first and second compact windows remain active in the display.

9. The computing system of claim 1, wherein the computing system to further caused to perform the following:
    receive, from the second application running on the computing system, one or more second customization parameters that define how the second application is to be configured in a second compact overlay window;
    generate the second compact overlay window, the second compact overlay window being customizable according to the second customization parameters; and
    position the second compact overlay window in a second portion of the display of the computing system,
    wherein both the first and second compact windows remain active in the display.

10. The computing system of claim 1, wherein generating the compact overlay window comprises generating the compact overlay window when the first application is launched.

11. The computing system of claim 1, wherein generating the compact overlay window comprises generating the compact overlay window from an existing non-compact overlay window that is running the first application.

12. A computing system for implementing a customizable compact overlay window in a display, the computing system comprising:
at least one processor; and
at least one storage device having stored thereon computer-executable instructions which, when executed by the at least one processor, causes the computing system to perform the following:
identify, at the computing system, a first application installed on the computing system in the form of a first set of executable code;
cause the first application to operate within a first application window on the display of the computing system;
identify, at the computing system, a second application installed on the computing system in the form of a second set of executable code that is separate from the first set of executable code, wherein the first application and the second application are different applications;
cause the second application to operate on the display of the computing system;
based on causing the second application to operate on the display of the computing system, receive, from the second set of executable code corresponding to the second application, one or more customization parameters from a set of executable code corresponding to the second application installed on the computing system, the one or more customization parameters defining one or more regions of the customizable compact overlay window where received user input is to be passed directly to the second application that uses the compact overlay window;
generate the customizable compact overlay window according to the one or more defined regions in the display of the computing system, wherein the first application window displaying the first application and the compact overlay window displaying the second application are simultaneously displayed at the computing system;
in response to receiving user input entered into at least one of the one or more defined regions, directly passing the user input to the second application, the user input being interpretable by the second application in a manner determined by the second application; and
in response to receiving user input entered into a region of the compact overlay window that is not part of the one or more defined regions, interpreting the user input at the computer system rather than the second application.

13. The computing system of claim 12, wherein the computing system is further caused to perform the following:
receive one or more customization parameters for the one or more defined regions, the customization parameters defining features that are to be rendered in the one or more defined regions by the first application.

14. The computing system of claim 13, wherein the user input is interpreted in a manner consistent with the features rendered in the one of the one or more regions.

15. The computing system of claim 12, wherein the computing system receiving and interpreting the user input comprises:
determining that user input indicates that the compact overlay window is to be moved in the display to a new position or is to be resized; and
moving the compact overlay window to the new position or to resizing the compact overlay window.

16. The computing system of claim 12, wherein the computing system receiving and interpreting the user input comprises:
determining that the user input is not a type of input that is to be handled by the computing system;
notifying the first application that the user input has occurred in the region of the compact overlay window that is not part of the one or more defined regions; and
allowing the first application to respond to the user input in the region of the compact overlay window that is not part of the one or more defined regions in a manner determined by the first application.

17. A computing system for implementing a customizable compact overlay window in a display, the computing system comprising:
at least one processor; and
at least one storage device having stored thereon computer-executable instructions which, when executed by the at least one processor, causes the computing system to perform the following:
identify a first application installed on the computing system in the form of a first set of executable code received from a first source;
cause the first application to operate within a first application window on the display of the computing system;
identify, at the computing system, a second application installed on the computing system in the form of a second set of executable code that is separate from the first set of executable code, wherein the first application and the second application are different applications;
cause the second application to operate on the display of the computing system;
based on causing the second application to operate on the display of the computing system, generate the customizable compact overlay window that is customizable by the second application that uses the compact overlay window, wherein the computing system implements the compact overlay window upon receiving one or more customization parameters from the set of executable code corresponding to the second application that define how the computing system should implement the compact overlay window;
automatically position the compact overlay window in a portion of the display of the computing system that overlaps the first application window;
receive first input into at least a portion of the compact overlay window that has a corresponding application specific control defined within the one or more customization parameters received from the set of executable code corresponding to the second application;
based on receiving the first input that has a corresponding application specific control, directly pass the input to the second application and allow the second application to respond to the input; and in response to an indication that the second application has not defined a response to the input to the at least one portion of the compact overly window, determine, at the computing system, a response to the input.

18. The computing system of claim 17, wherein the computing system determining a response to the input comprises one of:

determining that the compact overlay window should be resized; or determining that the compact overlay window should be moved to a different portion of the display.

19. The computing system of claim 17, wherein the indication that the first application has not defined a response to the input to the at least one portion of the compact overly window comprises:

the first application passing the input to the computing system.

20. The computing system of claim 1, wherein the first application and the second application are programmatically separate and independently executable at the computer system.

* * * * *